US011472061B2

(12) United States Patent
Bubb

(10) Patent No.: US 11,472,061 B2
(45) Date of Patent: Oct. 18, 2022

(54) SYSTEM AND METHODS OF PLUGGING CERAMIC HONEYCOMB BODIES

(71) Applicant: Corning Incorporated, Corning, NY (US)

(72) Inventor: Keith Norman Bubb, Beaver Dams, NY (US)

(73) Assignee: Corning Incorporated, Corning, NY (US)

(*) Notice: Subject to any disclaimer, the term of this patent is extended or adjusted under 35 U.S.C. 154(b) by 953 days.

(21) Appl. No.: 16/316,936

(22) PCT Filed: Jul. 13, 2017

(86) PCT No.: PCT/US2017/041838
§ 371 (c)(1),
(2) Date: Jan. 10, 2019

(87) PCT Pub. No.: WO2018/013753
PCT Pub. Date: Jan. 18, 2018

(65) Prior Publication Data
US 2019/0299486 A1 Oct. 3, 2019

Related U.S. Application Data

(60) Provisional application No. 62/361,807, filed on Jul. 13, 2016.

(51) Int. Cl.
*B28B 11/00* (2006.01)
*C04B 38/00* (2006.01)
(Continued)

(52) U.S. Cl.
CPC ............ *B28B 11/007* (2013.01); *C04B 28/24* (2013.01); *C04B 35/03* (2013.01); *C04B 35/10* (2013.01);
(Continued)

(58) Field of Classification Search
CPC ................ B28B 11/007; C04B 38/0012
See application file for complete search history.

(56) References Cited

U.S. PATENT DOCUMENTS 6,673,300 B2   1/2004  Allen et al.
8,182,603 B2   5/2012  Cecce et al.
(Continued)

FOREIGN PATENT DOCUMENTS

CN   102574294 A   7/2012
CN   204745876 U   11/2015
(Continued)

OTHER PUBLICATIONS

Japanese Patent Application No. 2019-500804, Office Action dated Jun. 15, 2021, 8 pages (4 pages of English Translation and 4 pages of Original Document), Japanese Patent Office.
(Continued)

*Primary Examiner* — Erin Snelting
(74) *Attorney, Agent, or Firm* — Joseph M. Homa

(57) ABSTRACT

A system and method to dry plug cement in a ceramic honeycomb body during the manufacture of plugged ceramic honeycomb bodies. The system includes a heating element (520) configured to immediately heat without contact a face (502) of a ceramic honeycomb body (500) plugged with a wet plug cement (510) to rapidly dry and stiffen the plug cement (510) on the face (502) of the ceramic honeycomb body (500). The method includes immediately applying heat without contact to a face (502) of a ceramic honeycomb body (500) having wet plug cement (510) disposed in channels (508) of the ceramic honeycomb body at the face, and rapidly drying and stiffening the plug cement on the face of the ceramic honeycomb body.

9 Claims, 2 Drawing Sheets

(51) Int. Cl.
*C04B 28/24* (2006.01)
*C04B 35/48* (2006.01)
*C04B 35/14* (2006.01)
*C04B 35/185* (2006.01)
*C04B 35/10* (2006.01)
*C04B 35/03* (2006.01)
*C04B 35/58* (2006.01)
*C04B 35/50* (2006.01)
*C04B 35/565* (2006.01)
*C04B 35/119* (2006.01)
*C04B 35/478* (2006.01)
*C04B 35/488* (2006.01)
*C04B 35/16* (2006.01)
*C04B 35/443* (2006.01)
*C04B 35/46* (2006.01)
*C04B 35/117* (2006.01)
*C04B 35/56* (2006.01)
*C04B 35/195* (2006.01)
*C04B 111/00* (2006.01)

(52) U.S. Cl.
CPC .......... *C04B 35/117* (2013.01); *C04B 35/119* (2013.01); *C04B 35/14* (2013.01); *C04B 35/16* (2013.01); *C04B 35/185* (2013.01); *C04B 35/195* (2013.01); *C04B 35/443* (2013.01); *C04B 35/46* (2013.01); *C04B 35/478* (2013.01); *C04B 35/48* (2013.01); *C04B 35/488* (2013.01); *C04B 35/50* (2013.01); *C04B 35/56* (2013.01); *C04B 35/565* (2013.01); *C04B 35/58* (2013.01); *C04B 38/0006* (2013.01); *C04B 38/0012* (2013.01); *C04B 2111/0081* (2013.01); *C04B 2111/00793* (2013.01)

(56) References Cited

U.S. PATENT DOCUMENTS

| | | | |
|---|---|---|---|
| 9,752,477 | B2 | 9/2017 | Aoyama et al. |
| 2004/0198599 | A1* | 10/2004 | Kato ................... B01D 41/02 502/439 |
| 2006/0213164 | A1* | 9/2006 | Hatano ............... B01D 46/2459 55/523 |
| 2007/0037703 | A1 | 2/2007 | Muroi |
| 2008/0017034 | A1 | 1/2008 | Becue et al. |
| 2008/0116601 | A1* | 5/2008 | Naruse ................. B01J 37/0215 264/319 |
| 2009/0140467 | A1* | 6/2009 | Calkins, Jr. ......... B01D 46/0001 264/426 |
| 2009/0286041 | A1 | 11/2009 | Deneka et al. |
| 2017/0313628 | A1* | 11/2017 | Noguchi ............... C04B 35/195 |
| 2019/0201825 | A1* | 7/2019 | Soga .................... C04B 38/0006 |

FOREIGN PATENT DOCUMENTS

| | | |
|---|---|---|
| EP | 2481542 A1 | 8/2012 |
| EP | 2977162 A1 | 1/2016 |
| JP | 10-314523 A | 12/1998 |
| JP | 2004-290766 A | 10/2004 |
| JP | 2007-167848 A | 7/2007 |
| JP | 2009-154124 A | 7/2009 |
| JP | 2013-146687 A | 8/2013 |
| JP | 2014-069158 A | 4/2014 |
| WO | 2007/132530 A1 | 11/2007 |
| WO | 2009/088078 A1 | 7/2009 |
| WO | 2009/088079 A1 | 7/2009 |
| WO | 2014/148460 A1 | 9/2014 |
| WO | 2016/052682 A1 | 4/2016 |

OTHER PUBLICATIONS

Japanese Patent Application No. 2019-500804, Office Action dated Oct. 22, 2020, 8 pages (4 pages of English Translation and 4 pages of Original Document); Japanese Patent Office.

International Search Report and Written Opinion of the International Searching Authority; PCT/US2017/041838 dated Nov. 20, 2017; 13 Pages; European Patent Office.

Chinese Patent Application No. 201780043326.4; English Translation of the Office Action dated Feb. 3, 2020; China Patent Office; 9 PGS.

* cited by examiner

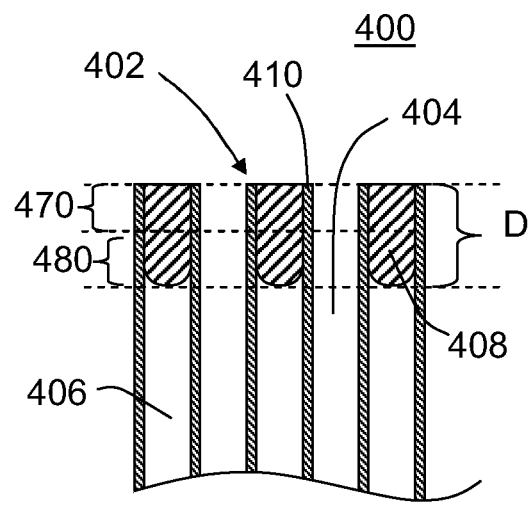
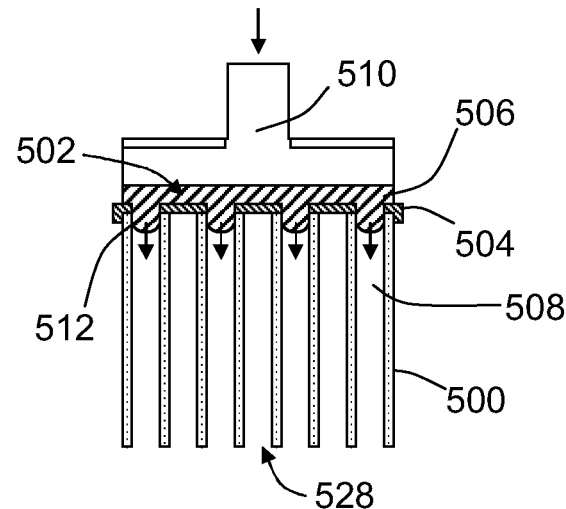
FIG. 4  FIG. 5
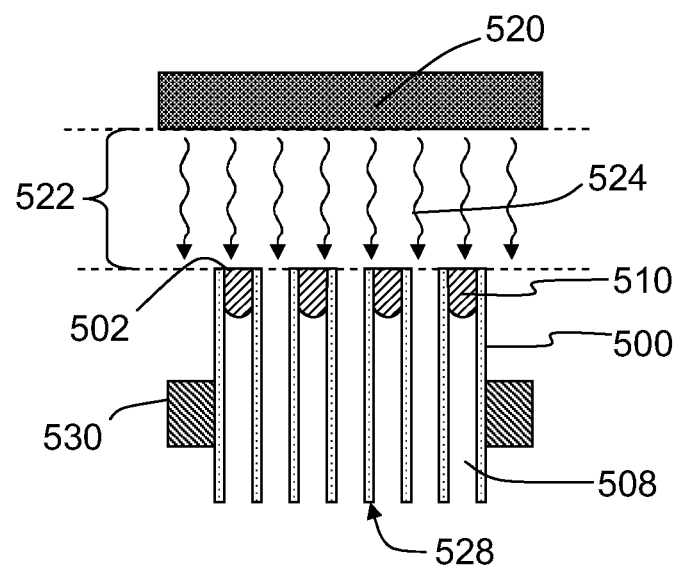
FIG. 6

SYSTEM AND METHODS OF PLUGGING CERAMIC HONEYCOMB BODIES

This application is a National Stage application under 35 U.S.C. § 371 of International Application No. PCT/US2017/041838, filed on Jul. 13, 2017, which claims the benefit of priority to U.S. Provisional Application No. 62/361,807, filed Jul. 13, 2016, the contents of which are incorporated herein by reference in their entireties.

FIELD

Exemplary embodiments of the present disclosure relate to systems and methods of manufacturing plugged ceramic honeycomb bodies, more particularly, to systems and methods of drying plugging cement of ceramic honeycomb bodies.

BACKGROUND

After-treatment of exhaust gas from internal combustion engines may use catalysts supported on high-surface area substrates and, in the case of diesel engines and some gasoline direct injection engines, a catalyzed filter for the removal of carbon soot particles. Porous ceramic flow-through honeycomb substrates and wall-flow honeycomb filters may be used in these applications.

The above information disclosed in this Background section is only for enhancement of understanding of the background of the disclosure and therefore it may contain information that does not form any part of the prior art nor what the prior art may suggest to a person of ordinary skill in the art.

SUMMARY

Exemplary embodiments of the present disclosure provide a method of making a plugged honeycomb body.

Exemplary embodiments of the present disclosure also provide a system to manufacture a plugged honeycomb body.

Additional features of the disclosure will be set forth in the description which follows, and in part will be apparent from the description, or may be learned by practice of the disclosure.

An exemplary embodiment discloses a method of making a plugged honeycomb body. The method includes contacting a first end face of a honeycomb body with a first mask having openings. The honeycomb body includes a matrix of intersecting walls defining cell channels extending from the first end face to a second end face. The method also includes injecting a wet plug cement through the openings in the first mask and into at least some of the cell channels at the first end face. The method further includes removing the first mask from the first end face, and disposing a heat source in proximity of the first end face. The heat source is spaced apart from the first end face. The method includes heating the first end face with the heat source to only partially dry the wet plug cement in the at least some of the cell channels at the first end face.

Another exemplary embodiment discloses a system to manufacture a plugged honeycomb body. The system includes an injection member configured to inject a wet plug cement into at least some cell channels extending from an end face of a honeycomb body. The system also includes a heater member configured to face the end face of the honeycomb body and configured to heat the end face without contact to only partially dry the wet plug cement in the at least some of the cell channels at the end face.

It is to be understood that both the foregoing general description and the following detailed description are exemplary and explanatory and are intended to provide further explanation of the disclosure.

BRIEF DESCRIPTION OF THE FIGURES

The accompanying drawings, which are included to provide a further understanding of the disclosure and are incorporated in and constitute a part of this specification, illustrate exemplary embodiments of the disclosure, and together with the description serve to explain the principles of the disclosure.

FIG. 4 is a schematic partial side view of a honeycomb body at a plugged end face.

FIG. 5 is a schematic side view of a system and method of plugging cells in a honeycomb body according to exemplary embodiments of the disclosure.

FIG. 6 is a schematic side view of the system and method of plugging cells in a honeycomb body according to exemplary embodiments of the disclosure.

DETAILED DESCRIPTION

Figure 1:
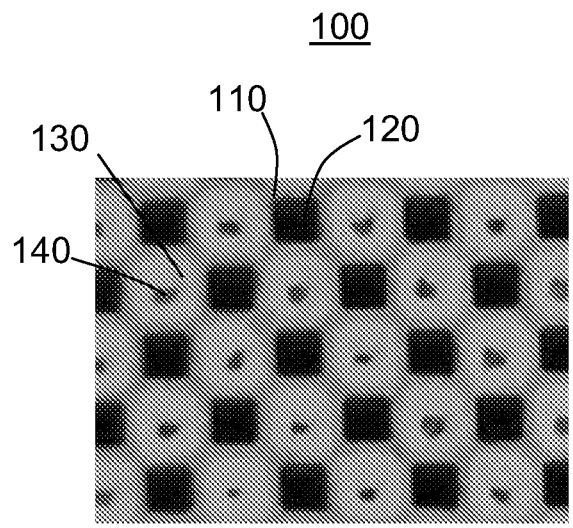
FIG. 1 shows a close up view of a honeycomb body end face after air drying cement plugs according to a comparative process.

The manufacture of porous ceramic honeycomb bodies may be accomplished by the process of plasticizing ceramic powder batch mixtures, extruding the mixtures through honeycomb extrusion dies to form honeycomb extrudate, and cutting, drying, and firing the extrudate to produce ceramic honeycomb bodies of high strength and thermal durability having channels extending axially from a first end face to a second end face. As used herein a ceramic honeycomb body includes ceramic honeycomb monoliths and ceramic segmented honeycomb bodies.

A co-extruded or an after-applied exterior skin may form an outer axial peripheral surface of the ceramic honeycomb bodies. Each channel of the honeycomb bodies, whether monolithic or segmented, can be plugged at an inlet face or an outlet face to produce a filter. When some channels are left unplugged a partial filter can be produced. The honeycomb body, whether monolithic or segmented, can be catalyzed to produce a substrate. Further, filters and partial filters can be catalyzed to provide multi-functionality. The ceramic honeycomb bodies thus produced are widely used as ceramic catalyst supports in motor vehicle exhaust systems, and as catalyst supports and wall-flow particulate filters for the removal of soot and other particulates from engine exhausts.

Among the commercially successful processes for ceramic honeycomb manufacture are those that utilize large co-rotating twin screw extruders for the mixing and extruding of ceramic honeycomb extrudate. Ram extrusion, pressing, casting, spraying and 3-dimensional printing are other processes for ceramic honeycomb manufacture.

Plugging processes for porous ceramic honeycomb filters involves pushing wet cement paste into channels of a honeycomb body at an end face to form a wet plug and then drying in a dryer, for example in a microwave or hot air dryer. During production, there can be a significant lag time of 5 to 10 minutes between when the part is plugged and when the part reaches the entrance of the dryer. Before the part reaches the dryer, drying kinetics tend to drive the water into the porous ceramic honeycomb body channel walls. This can result in shrinkage of the wet plug that can cause a void or dimple in the center and top of the plug. Herein the top of the plug refers to the outer surface at the plugged honeycomb body end face. In contrast, if the part is immediately introduced to the dryer the face is then heated immediately. Once the face is significantly dry the plug cement can no longer move and cause dimples.

However, the hot air dryer competes with the internal water removal into the channel walls, and cannot eliminate defects such as dimples completely. In addition, inserting the parts with wet plugs immediately into the dryers can be difficult because parts often need inspections and other steps between plugging and drying.

A technique was described in U.S. Patent Application Publication No. 2009/0140467, filed on Nov. 25, 2008, the entire contents of which is hereby incorporated by reference, utilizing a heated tamper to contact a plugged end face. This describes a heated plate that the part face is pressed into after plugging to reduce defects such as dimples. However, the heated tamper is an additional process step that may reduce manufacturing efficiency and may cause the plug cement to shrink away from the channel wall resulting in light leakers, where light is detected through or around plugs in plugged channels during inspection. The plug cement shrinking away from the channel wall is the opposite phenomenon from the formation of an internal void in the plug in which the plug cement opens up around a pocket or pockets of air internal to the column of plug cement.

Exemplary embodiments of the current disclosure provide a method of non-contact heating an end face instantly after the end face has been plugged with cement to rapidly dry and stiffen the plug cement at the end face of a porous ceramic honeycomb body. Exemplary embodiments of the current disclosure also provide a system to heat without contacting an end face instantly after the end face has been plugged with cement to rapidly dry and stiffen the plug cement at the end face of the honeycomb body. As used herein, the terms "instantly" and "immediately" refer to a time lag of less than 5 minutes, for example, less than 3 minutes, less than 2 minutes, less than 1 minute, less than 30 seconds, less than 20 seconds, less than 15 seconds, less than 5 seconds, or even less than 1 second. According to these exemplary embodiments, a method and a system are provided that only partially dries the plug cement in cell channels at the end face prior to a dryer to reduce and eliminate surface defects, including, for example, voids and dimples. After the immediate non-contact drying, the plugged honeycomb body can be further dried in a dryer such as a microwave or hot air dryer.

FIG. 1 shows a close up view of a honeycomb body end face 100 after air drying cement plugs according to a comparative process. End face 100 of the honeycomb body includes intersecting porous ceramic walls 110 extending from the end face 100 to form cell channels 120 and dried cement plugs 130 in some channels 120 at the end face 100.

As shown in FIG. 1, the part was plugged with a wet cement paste, such as a cold-set cement paste as described in U.S. Patent Application Publication No. 2013/0136893, filed Nov. 30, 2011, the entire contents of which is hereby incorporated by reference, and left to air dry in ambient conditions, for example at room temperature (RT) of 18° C. to 25° C. and relative humidity of 10% to 90%. As can be seen in FIG. 1, the result is large surface voids (dimples) 140.

The composition of the wet cement paste was not particularly limited and an example used herein is set forth in Table 1.

TABLE 1

| Ingredient | Composition |
|---|---|
| Cordierite Powder (Coarse) | 100% |
| Colloidal Silica* | 25 wt. % |
| Organic Binder* | 1.5 wt. % |
| Water* | 33 wt. % |

*Indicates the weight percentage for the batch ingredient was calculated as a superaddition relative to the combined total weight of the powdered cordierite.

The composition of the plug wet cement paste is not necessarily limited and can include, for example, inorganic powder, inorganic binder, organic binder, liquid vehicles, and additives, such as surfactants, solvents, non-solvents, lubricants, pore formers, and the like.

For example, the inorganic powder can include particles of cordierite, fused silica, silicates, silicon carbide, alumina, aluminum oxide, aluminum titanate, titania, magnesium, magnesium stabilized alumina, calcium stabilized alumina, zirconia, zirconium oxide, zirconia stabilized alumina, yttrium stabilized zirconia, calcium stabilized zirconia, zirconium mullite, mullite, spinel, magnesia, niobia, ceria, nitride, carbide, and the like, or any combination thereof.

The inorganic binder may, in various embodiments, be colloidal, such as for example, colloidal silica. Other inorganic binders that may be used include, for example, palygorskite, natural clay, bentonite, kaolin, or a cellulose-based inorganic binder. Non-limiting inorganic binders include, by way of example, colloidal silicas such as Ludox HS (HS-40 Ludox®), AS, and SK, available from W.R. Grace & Company. Non-limiting organic binders may include, for example, cellulose materials, such as, methylcellulose; a wide variety of gums, such as, for example, Xanthan gum and actigum; and polyvinyl alcohol and derivatives thereof. It is contemplated that other organic binders may be suitable for use in the plugging cement composition, such as, for example, hydroxypropylmethylcellulose, and other methylcellulose derivatives, and/or any combinations thereof. An exemplary methylcellulose binder is Methocel™ A4M, available from the Dow Chemical Company of Midland, Mich., USA.

According to certain embodiments, the liquid vehicle can be water, although it should be understood that other liquid vehicles exhibiting solvent action with respect to suitable organic binders can be used. The liquid vehicle may be incorporated to provide a flowable or paste-like consistency to the aqueous compositions, for example, so that the aqueous composition can be applied to a honeycomb body as a paste or cement.

Figure 2:
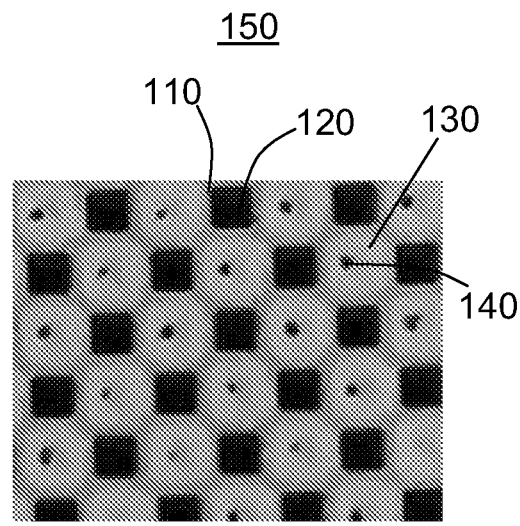
FIG. 2 shows a close up view of a honeycomb body end face after air drying cement plugs of the same composition as in FIG. 1 according to a second comparative process.

FIG. 2 shows a close up view of a honeycomb body end face 150 after air drying cement plugs of the same composition as in FIG. 1 according to a second comparative process. The part shown in FIG. 2 was transported to the dryer with minimal time delay of 5 to 10 minutes. As can be seen in FIG. 2, the result is large surface voids (dimples) 140 although the quality is slightly better than the result shown in FIG. 1.

Figure 3:
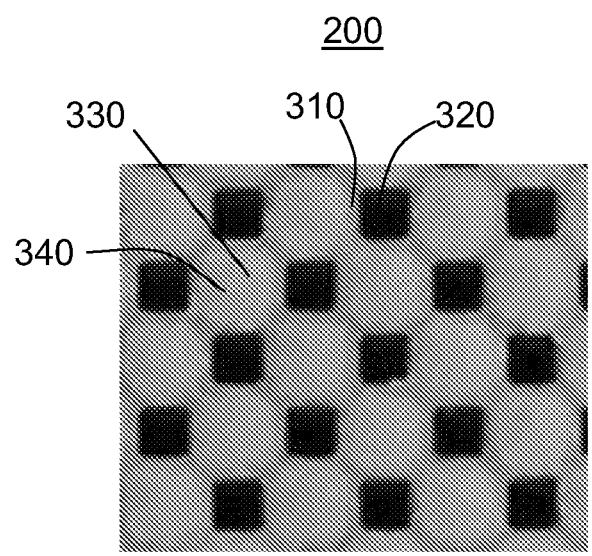
FIG. 3 shows a close up view of a honeycomb body end face after drying cement plugs of same composition as in FIG. 1 according to exemplary embodiments of the disclosure.

FIG. 3 shows a close up view of a honeycomb body end face 200 after drying cement plugs 330 according to exemplary embodiments of the disclosure, wherein the wet cement paste was of the same composition as in FIG. 1. End face 200 of the honeycomb body includes a matrix of intersecting porous ceramic walls 310 extending from the end face 200 to form cell channels 320 and dried cement plugs 330 in some channels 320 at the end face 200.

The plugged end face 200 shown in FIG. 3 was plugged with wet cement in some of the channels 320 at the end face 200, and heated for two minutes, using a hot plate located about 1 inch (2.54 cm) away from the end face 200 of the plugged part in order to produce a 100'C region at the plug face 200, before the part was subsequently dried at 75'C. As shown, the plugs 330 exhibit a smooth, defect free top surface 340 and surface voids (dimples) are eliminated. In this case, non-contact heat was applied to the end face 200 to commence drying within about 20 seconds to 30 seconds after plugging.

In the example shown in FIG. 3 to demonstrate the improvement in plug quality according to exemplary embodiments of the disclosure, a hot plate was used to heat the plugged end face 200, but the disclosure is not so limited and other heat sources can be used to heat the end face 200 of the part immediately after the plugging process with wet cement paste such as infrared heating, laser heating, microwave heating, and other radiative heating techniques, hot air and other conduction and convection techniques, and the like, and combinations thereof. Conduction heating as used herein refers to non-contact conduction heating, such as conduction through an atmosphere such as air, for example, air molecules heating the end face 200 of the part. For example, the hot plate to heat the plugged end face 200 without contacting the plugged end face 200 may have a radiative heating component, a conductive heating component, and a convective heating component.

The method and system according to exemplary embodiments of the disclosure will be described with reference to FIGS. 4, 5, and 6.

The method includes plugging a honeycomb body 400. FIG. 4 shows a schematic partial side view of a honeycomb body 400 at a plugged end face 402. The honeycomb body 400 has an array of substantially parallel, longitudinal cells 404 defined by a matrix of intersecting walls 410. The cells 404 extend between opposite end faces of the columnar body. The cells 404 are defined by a matrix of intersecting porous ceramic walls 410. The cells 404 and walls 410 are bounded by a skin, which may have a circular, oval, or other shape. The cells 404 may have any suitable cross-section such as square, hexagonal, circular, and combinations thereof. For exhaust particulate filtration applications, the honeycomb body 400 can be made of a ceramic material such as cordierite, aluminum titanate, or silicon carbide. Any suitable method may be used to make the honeycomb body 400. After plugging, the honeycomb body 400 having some channels 406 filled to a depth D measured from the end face 402 with wet cement paste are dried, cured or fired to form plugs 408 and a plugged honeycomb body. For example, D can be from greater than 3 mm to 15 mm.

FIGS. 5 and 6 are schematic side views of systems and methods of plugging cells in a honeycomb body according to exemplary embodiments of the disclosure. To plug selected channels, an aqueous composition such as the disclosed wet cement paste can be forced into selected open cells of a desired porous ceramic honeycomb body in the desired plugging pattern and to the desired depth, by one of several plugging process methods. For example, the plugging can be effectuated by using a masking apparatus and process such as that disclosed and described in U.S. Pat. No. 6,673,300, the wall flow configuration disclosed and described in PCT Publication No. PCT/US2008/013009, and U.S. Patent Application Publication No. 2009/0286041, the entire contents of all of which are hereby incorporated by reference.

The method of making a plugged honeycomb body includes contacting a first end face 502 of the honeycomb body 500 with a first mask 504, such as a flexible mask having openings therethrough. The first mask 504 may be made of a material such as silicone polymer or other non-reactive polymer, and may be formed into a film. The method further includes injecting a plugging medium 506, such as the wet cement paste, through the first mask 504 into the first end face 502 of the honeycomb body 500 while the first mask 504 contacts the first end face 502.

The plugging medium 506 is injected into at least some of the cells 508 in the first end face 502 in order to eventually form plugs 510 in those cells upon further curing or drying or firing of the injected plugging medium 506. A piston 510 can press slugs 512 of the plugging medium 506 into at least some of the cells 508 in the first end face 502 in order to eventually form plugs 510 in those cells. The plugs 510 formed in at least some of the cells 508 are preferably flush or substantially flush with the first end face 502. The method further includes removing the first mask 504 from the first end face 502, i.e. terminating contact between the first mask 504 and the first end face 502.

Then, the first end face 502 is immediately non-contact heated with a heater element 520. The heater element 520 may be any suitable heater, such as an electrical heater, infrared heater, laser heater, microwave heater, and other radiative heaters, hot air, hot air blower, and other conduction and convection heaters, and the like, and combinations thereof. The heater element 520 is disposed in proximity to the first end face 502 to face the first end face 502. The heater element 520 is spaced apart from the first end face 502 by a distance 522 such that the heater element 520 (heat source) does not contact the first end face 502. Heat 524 is applied immediately after the plugging medium 506 is injected into at least some of the cells 508 in the first end face 502 and can be radiative, conductive, such as through an atmosphere, and/or convective, such as through a moving atmosphere, for example, blowing hot air on the first end face 502. For example, the first end face 502 is non-contact heated with a heater element 520 immediately after the plugging medium 506 is injected into at least some of the cells 508 in the first end face 502 or immediately after terminating contact between the first mask 504 and the first end face 502.

FIG. 6 shows a heat source 520 disposed in proximity to the first end face 502, wherein the heat source 520 is spaced apart from the first end face 502; and heating the first end face 502 with the heat source 520 to only partially dry the wet plug cement 506 in the at least some of the cell channels 508 at the first end face 502. The heat source such as the heater element 520 can face the first end face 502. The heat source such as the heater element 520 can be spaced from 0.1 cm to 12.7 cm apart from the first end face 502.

In some embodiments, the plugging medium 506 in the first end face 502 is only partially dried as a result of non-contact heating with the heater element 520. In some embodiments, as a result of the non-contact heating with the heater element 520, the plugging medium 506 such as 470 in FIG. 4 nearer the heater element 520 is dried but the plugging medium farther away from the heater element 520 such as 480 in FIG. 4 remains wet. For example, the heater element 520 dries the plug cement 506 in the at least some of the cell channels 508 at the first end face 502 to a depth 470 of at least 0.1 mm into the at least some of the cell channels 508. For example, the heater element 520 dries the plug cement 506 in the at least some of the cell channels 508 at the first end face 502 to a depth 470 of at least 0.5 mm into the at least some of the cell channels 508. For example, to a depth 470 of at least 1 mm, 2 mm, 5 mm, or even 10 mm into the at least some of the cell channels 508. The heater element 520 dries the plug cement 506 in the at least some of the cell channels 508 at the first end face 502 to a depth 470 of no more than 90% of the plug depth into the at least some of the cell channels 508. For example, to a depth 470 of no more than 80%, 60%, 50%, 30%, or even 10% of the plug depth into the at least some of the cell channels 508.

The method further includes terminating heating of the first end face 502 by the heater element 520. In one embodiment, the plugging medium 506 is flush with the first end face 502 after non-contact heating with the heater element 520 is terminated. In one embodiment, the first end face 502 is non-contact heated with the heater element 520 for a duration in a range from 1 second to 15 minutes. In another embodiment, the first end face 502 is non-contact heated with the heater element 520 for a duration in a range from 10 seconds to 5 minutes. In another embodiment, the first end face 502 is non-contact heated with the heater element 520 for a duration in a range from 10 second to 60 seconds. In another embodiment, the first end face 502 is non-contact heated with the heater element 520 for a duration in a range from 15 seconds to 180 seconds, for example, 3 minutes, or even 2 minutes. In another embodiment, the first end face 502 is non-contact heated with the heater element 520 for a duration in a range from 10 second to 30 seconds. In one embodiment, the first end face 502 is non-contact heated with the heater element 520 at a temperature greater than 37° C. but less than 300° C. In one embodiment, the first end face 502 is maintained at a temperature greater than 65° C. but less than 288° C. by non-contact heating with the heater element 520. In one embodiment, the first end face 502 is maintained at a temperature greater than 67° C. but less than 300° C. In another embodiment, the first end face 502 is maintained at a temperature greater than 75° C. but less than 300° C. In another embodiment, the first end face 502 is maintained at a temperature greater than 93° C. but less than 300° C. In one embodiment, injection of the plugging medium 506 through the first flexible mask 504 occurs at a first location, and the first end face 502 is non-contact heated with the heater element 520 at a second location different from the first location.

The method further includes contacting a second end face 528 of the honeycomb 500 with a second mask, such as a flexible mask, having openings therethrough. The process described above for plugging the first end face 502 may be repeated for the second end face 528. Wet plug cement 506 can be injected into at least some of the cell channels 404 at the second end face 528 not injected with wet plug cement 506 at the first end face 502. A heat source such as the heater element 520 can be disposed in proximity to the second end face 528 and spaced apart from the second end face 528 to non-contact heat the second end face 528 with the heat source 520 to only partially dry the plug cement 506 in the at least some of the cell channels 404 at the second end face 528.

Plugging the first end face 502 and the second end face 528 and non-contact drying the first end face 502 and second end face 528 can be done simultaneously or sequentially. In some embodiments, the honeycomb body is then exposed to a drying environment to allow complete drying of the plugging medium 506 injected into the end faces of the honeycomb body 500.

Various plugging patterns may be used to achieve desired performances. One common plugging pattern is a checkerboard pattern. As an example, FIG. 4 shows a checkerboard pattern wherein each unplugged channel 404 is bordered on all sides by plugged channels 406, and vice versa. In some embodiments, only one end of each channel is plugged while the other end remains open. Channels having their ends plugged at the inlet end face of the honeycomb body can be referred to as outlet channels. Channels having their ends plugged at the outlet end face of the honeycomb body can be referred to as inlet channels. In general, plugged honeycomb bodies used for high-efficiency particulate filtration have plugs selectively arranged at both end faces of the honeycomb bodies such that flow entering the honeycomb body is forced through the porous cell walls before exiting the honeycomb body, allowing the porous cell walls to collect particulate matter separated from the flow.

According to exemplary embodiments of the disclosure and as described above a system to manufacture a plugged honeycomb body comprises an injection member 510 configured to inject a wet plug cement 506 into at least some cell channels 508 extending from an end face 502 of a honeycomb body 500 and a heater member 520 configured to face the end face 502 of the honeycomb body 500 and configured to heat the end face 502 without contact to only partially dry the wet plug cement 506 in the at least some of the cell channels 508 at the end face 502.

The system can further comprise a conveyor 530 configured to move the honeycomb body 500 to expose the end face 502 having the wet plug cement 506 in the at least some of the cell channels 508 at the end face 502 to the heater member 520. The conveyor 530 can be a gantry, conveyor belt, tray, and the like, and combinations thereof. The conveyor is configured to bring the end face 502 from the injection member 510 to face the heater member 520 in 5 minutes or less. For example, 3 minutes or less, 2 minutes or less, 1 minute or less, 30 seconds or less, 20 seconds or less, 10 seconds or less, 5 seconds or less, or even 1 second or less.

Advantages of exemplary embodiments of the disclosure include no extra process steps because the heat source such as heater member as described above can be disposed to heat the end face as the plugged honeycomb body moves to the dryer in current plugging systems. The heat source such as heater member are easily adjustable to avoid opposing issues of surface voids such as dimples and plug to wall separation as described above. Also, advantages of exemplary embodiments of the disclosure include elimination of defects such as dimples in the cement plugs.

It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Reference throughout this specification to exemplary embodiments and similar language throughout this specification may, but does not necessarily, refer to the same embodiment. Furthermore, the described features, structures, or characteristics of the subject matter described herein with reference to an exemplary embodiment may be combined in any suitable manner in one or more exemplary embodiments.

It will be apparent to those skilled in the art that various modifications and variations can be made in the present disclosure without departing from the spirit or scope of the disclosure. Thus, it is intended that the appended claims cover the modifications and variations of this disclosure provided they come within the scope of the appended claims and their equivalents.

The invention claimed is:

1. A method of making a plugged honeycomb body, the method comprising:
    contacting a first end face of a honeycomb body with a first mask having openings, wherein the honeycomb body comprises a matrix of intersecting porous ceramic walls defining cell channels extending from the first end face to a second end face;
    injecting a wet plug cement through the openings in the first mask and into at least some of the cell channels at the first end face;
    removing the first mask from the first end face;
    disposing a hot plate in proximity of the first end face, wherein the hot plate is spaced apart from the first end face; and
    non-contactingly heating the first end face with the hot plate to only partially dry the wet plug cement in the at least some of the cell channels at the first end face and terminating the heating while the plug cement is only partially dry, and
    after heating the first end face with the hot plate to only partially dry the plug cement in the at least some of the cell channels at the first end face, disposing the honeycomb body in a dryer and drying the honeycomb body,
    wherein the disposing the hot plate proximate the first end face is performed outside of the dryer.

2. The method of claim 1, wherein the wet plug cement comprises:
    an inorganic powder;
    a colloidal inorganic binder; and
    a liquid vehicle.

3. The method of claim 1, wherein the disposing the hot plate in proximity of the first end face is performed within 5 minutes of the injecting the wet plug cement.

4. The method of claim 1, wherein the hot plate is spaced from 0.1 cm to 12.7 cm apart from the first end face.

5. The method of claim 1, wherein the heating the first end face with the hot plate comprises heating to greater than 75° C.

6. The method of claim 1, wherein the heating the first end face with the hot plate is performed for less than 3 minutes before terminating to partially dry the plug cement in the at least some of the cell channels at the first end face.

7. The method of claim 1, wherein the heating the first end face with the hot plate is performed to dry the plug cement in the at least some of the cell channels at the first end face to a depth of at least 0.5 mm into the at least some of the cell channels.

8. The method of claim 1, wherein the heating the first end face with the hot plate is performed to dry the plug cement in the at least some of the cell channels at the first end face to a depth of no more than 80% of a plug depth into the at least some of the cell channels.

9. The method of claim 1, further comprising injecting the wet plug cement into at least some of the cell channels at the second end face not injected with wet plug cement at the first end face;
    disposing a heat source proximate the second end face, wherein the heat source is spaced apart from the second end face; and
    heating the second end face with the heat source to only partially dry the plug cement in the at least some of the cell channels at the second end face.

* * * * *